United States Patent [19]
Armstrong

[11] Patent Number: 4,656,722
[45] Date of Patent: Apr. 14, 1987

[54] METHOD OF FORMING A DECORATIVE PANEL OF MOLDED PLASTIC

[76] Inventor: Larry Armstrong, P.O. Box 1148, Poteau, Okla. 74953

[21] Appl. No.: 789,840

[22] Filed: Oct. 21, 1985

Related U.S. Application Data

[63] Continuation-in-part of Ser. No. 486,667, Jul. 25, 1983, abandoned.

[51] Int. Cl.[4] .................. B29C 51/10; B29C 71/00; B29C 33/40
[52] U.S. Cl. .................................... 29/527.2; 29/428; 264/553; 264/129; 264/220; 264/225; 264/226; 264/227; 264/DIG. 78
[58] Field of Search ............... 264/553, 510, 220, 225, 264/226, 227, 129, DIG. 78; 29/527.2, 428

[56] References Cited

U.S. PATENT DOCUMENTS

| | | | |
|---|---|---|---|
| 3,022,614 | 2/1962 | Dreyfus et al. | 264/553 X |
| 3,183,289 | 5/1965 | Leavesley, Jr. | 264/220 |
| 3,379,812 | 4/1968 | Yakovou | 264/227 |
| 3,621,625 | 11/1971 | Medow . | |
| 3,703,572 | 11/1972 | Bellasalma | 264/220 X |
| 3,751,540 | 8/1973 | Prahl, Jr. et al. | 264/553 X |
| 3,755,031 | 8/1973 | Hoffman et al. | 264/553 X |
| 4,001,361 | 1/1977 | Unruh . | |
| 4,157,885 | 6/1979 | Tippmann | 264/553 |
| 4,241,554 | 12/1980 | Infantino . | |
| 4,275,540 | 6/1981 | Keller . | |

FOREIGN PATENT DOCUMENTS

| | | | |
|---|---|---|---|
| 1146372 | 11/1957 | France | 264/225 |
| 57-45022 | 3/1982 | Japan | 264/225 |

Primary Examiner—Jan Silbaugh
Assistant Examiner—Neil M. McCarthy
Attorney, Agent, or Firm—William S. Dorman

[57] ABSTRACT

An improved method of forming a decorative panel of molded plastic comprising the steps of constructing a form having a detailed masonry surface; covering the detailed surface with a mold release material; applying a thin layer of gel coat over the mold release; applying a plurality of layers of fiberglass matte and resin over the gel coat layer; allowing the plurality of fiberglass matte and resin layers to harden thereby forming a heat resistant mold having a female side being formed against the detailed surface and a side opposite from the female side; removing the mold from the form; perforating the mold thereby providing fluid communication between the two sides; connecting a vacuum apparatus to the side opposite of the mold; placing a sheet of high impact plastic above and adjacent the female side of the mold; activating a heater thereby heating the plastic sheet to a pliable state; activating the vacuum apparatus thereby drawing the plastic sheet into the female side of the mold; and removing the formed panel from the mold.

6 Claims, 10 Drawing Figures

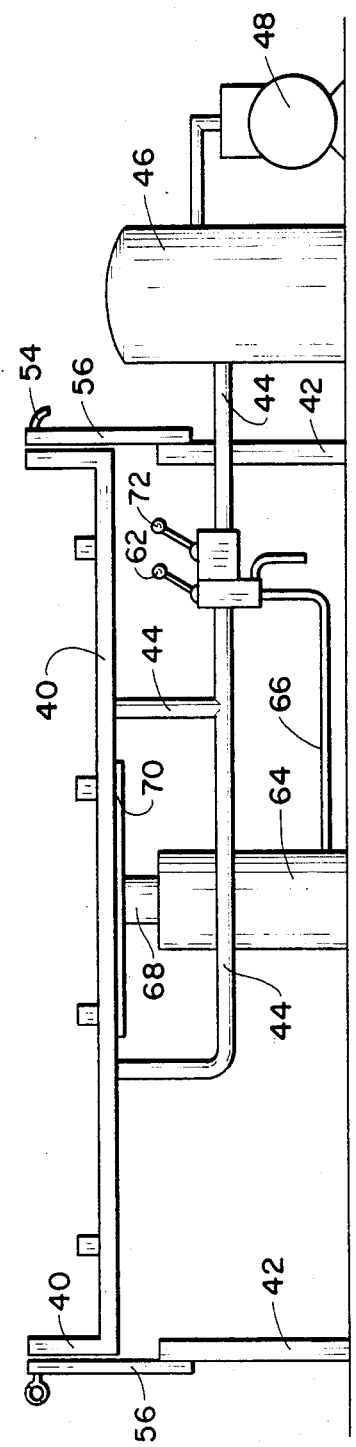
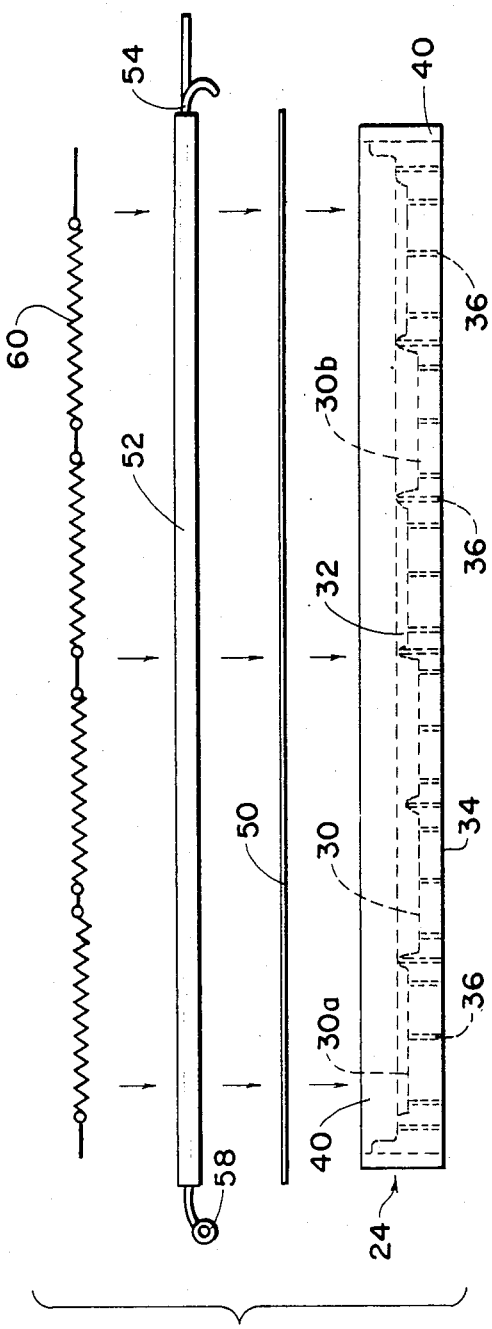
Fig. 4
Fig. 5

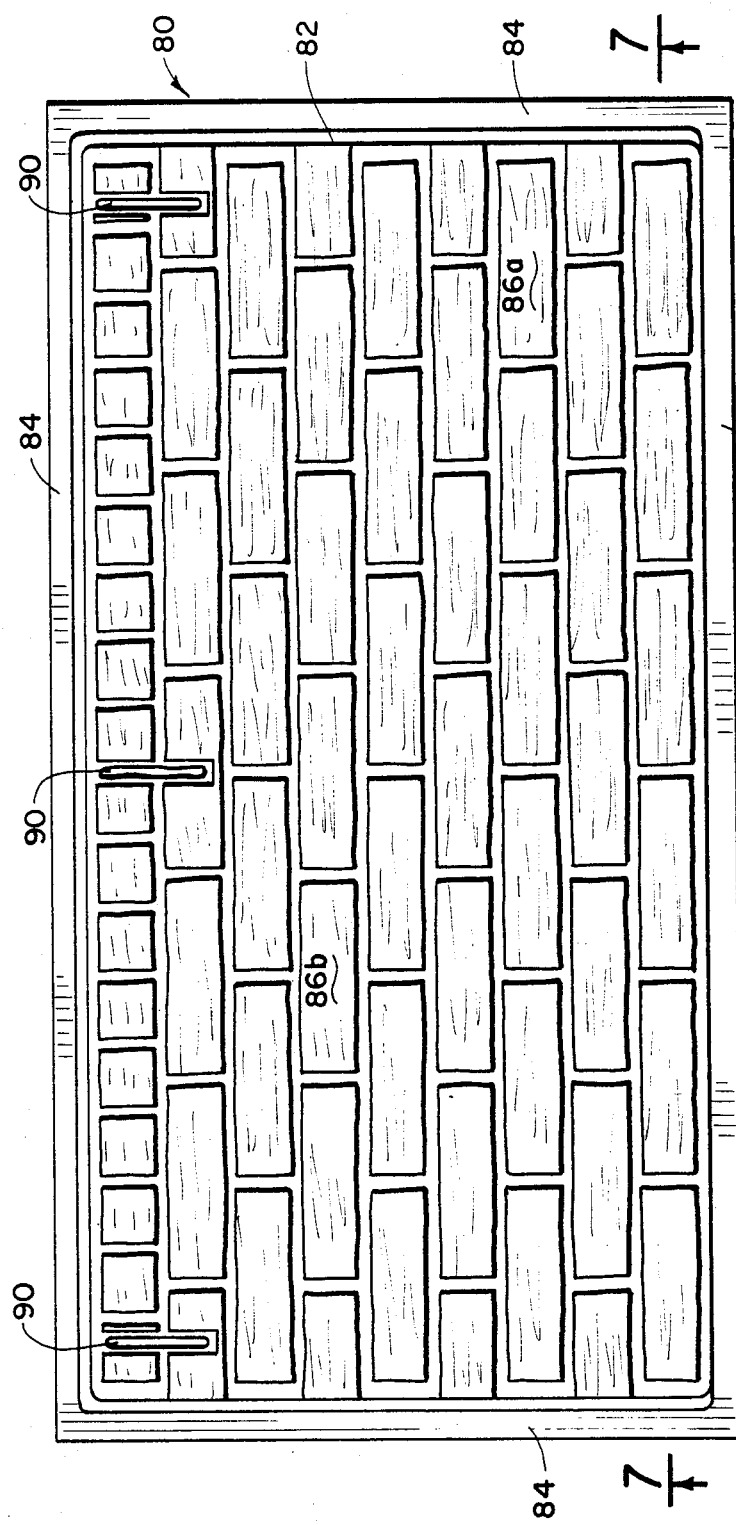
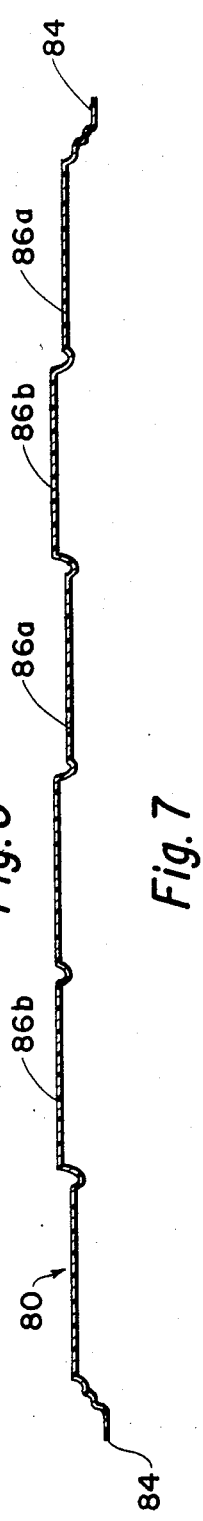
Fig. 6
Fig. 7

METHOD OF FORMING A DECORATIVE PANEL OF MOLDED PLASTIC

CROSS REFERENCES TO RELATED APPLICATIONS

This application is a continuation in part of the application entitled "Decorative Panel of Molded Plastic", Ser. No. 486,667, filed July 25, 1983, and now abandoned.

BACKGROUND OF THE INVENTION

1. Field of the Invention

The present invention relates to a method of forming a decorative panel of molded plastic for use as skirting for a mobile home, exterior covering for bare metal structures or the like. More particularly, the present invention relates to a method of mold construction used in conjunction with a vacuum forming process to produce decorative panels having a realistic appearance.

2. Prior Art

The use of various types of decorative plastic panels for use as mobile home skirting is well known in the prior art. As the popularity of mobile homes increases, many consumers desire an attractive and durable material to conceal the undercarriage of their mobile homes. Metal skirting, such as aluminum or steel, is easily dented and becomes permanently bent during settling. Since plastic is generally inexpensive it is the preferred material used in skirting. However, it is highly undesirable for the material to maintain its original plastic appearance since a great deal of mobile homes are permanently affixed to choice real estate lots.

In the prior art, manufacturers have sought various methods to construct skirting panels having a realistic appearance of stone masonry, brick walls and the like. Thin sheets of vinyl plastic, such as PVC, have been used to obtain a realistic appearance. However, the vinyl will become brittle and crack in lower temperatures and then alternately gets soft and warps during hot summer temperatures. The optimum temperature range for PVC vinyl is between 30° and 90° Fahrenheit. In northern climates damage to the PVC skirting due to frost heaves is quite common.

The following prior art U.S. patents have been uncovered as references:

| U.S. Pat. No. | Patentee | Issue Date |
| --- | --- | --- |
| 3,215,763 | Buerger | November 2, 1965 |
| 3,183,289 | Leavesley, Jr. | May 11, 1965 |
| 3,621,625 | Medow | November 23, 1971 |
| 3,755,031 | Hoffman et al. | August 28, 1973 |
| 3,379,812 | Yakovou | April 23, 1968 |
| 3,703,572 | Bellasalma | November 21, 1972 |
| 4,241,554 | Infantino | December 30, 1980 |
| 4,275,540 | Keller | June 30, 1981 |
| 4,001,361 | Unruh | January 4, 1977 |

Other references uncovered are as follows: French Pat. No. 1,146,372, issued November 1957 to Andre DuFour, and Japanese Pat. No. 57-45022, issued March 1982 to Toyota Motors.

A decorative skirting panel system for mobile homes is disclosed in U.S. Pat. No. 4,241,554 to Infantino. An expanded polystyrene is injected or poured into molds to form panels having exterior surfaces simulating masonry. The panels are installed by a V-shaped tongue and groove method.

U.S. Pat. No. 4,275,540 to Keller discloses a plastic panel resembling a free standing brick wall section. An open box mold is used to form the wall comprising four tiers of bricks which are bounded by cap stone sections on the top and bottom of each panel.

Another type of mobile home skirting side panel is disclosed in U.S. Pat. No. 4,001,361 to Unruh. The side panel is formed of a sheet of fused polystyrene beads to have the appearance of a masonry wall.

A method of making a panel is disclosed in U.S. Pat. No. 3,755,031 to Hoffman et al., which is used in structures such as cabinets, housings and the like. A plastic sheet and a thin cloth backing are formed into a laminate. The cloth backing is required to provide a flexible member or hinge to permit folding of the panel which is shipped in a knocked-down or flat condition.

A method of making a mold is disclosed in U.S. Pat. No. 3,215,763 to Buerger for subsequent forming of plastic deck panels used in the construction of small pleasure craft. A wood pattern having a smooth exterior surface is used as the form, which is covered with a thin flexible cover sheet. Any design formed in the gel coat of the Buerger mold is derived from the thin vinyl sheeting, such as "Naugahyde", used as a cover sheet. The fiberglass mold generated in the Buerger patent cannot be used in the high stress and high heat operation of vacuum forming.

The French reference to Andre Dufour discloses a method of fabrication for decorative paneling. A wooden model is placed in a box having a plurality of needles or spikes extending upwardly from its surface. Plaster of paris is used to form the mold having vertical channels formed by the spikes. The mold is placed over a vacuum source and a thin sheet of heated plastic is placed over the mold which is subsequently drawn into the mold. The formed plastic is then filled with sawdust and is then placed on a piece of furniture as a type of motif.

The Japanese reference to Toyota Motor discloses a method of mold preparation for vacuum forming. A pre-shaped wood pattern is first covered with an epoxy resin containing aluminum and then a heat resistant material, which forms a relatively thin mold. The mold is removed and perforated for vacuum forming of PVC plastic sheets. The mold created in the Japanese reference has a relatively short durability of 300 shots.

No prior art reference discloses a method of generating a pan-shaped mold formed from a plurality of fiberglass layers thereby creating a heat-resistant mold capable of withstanding years of vacuum forming. No prior art method teaches a highly detailed mold having a realistic detail on its female side capable of completely reproducing its pattern on a relatively thick sheet of high-impact plastic. No prior art method discloses an assembly-line process resulting in rapid production time and consistent results from panel to panel.

SUMMARY OF THE INVENTION

An object of the present invention is to produce a decorative panel of plastic having a realistically detailed surface to be used as mobile home skirting or as an exterior covering for a building. Another object of the present invention is to construct the above detailed panel from a relatively thick sheet of high-impact plastic to provide a highly durable product. A further object is to provide a method of constructing a durable, heat-resistant mold capable of reproducing a realistically detailed surface of the above thick plastic panel with consistent results from the mold over a long period of time. A still further object is to provide an assembly line method to produce the above panel is a short amount of time while requiring little skill from the line personnel.

The present invention comprises a method of forming a decorative panel of molded plastic for use as mobile home skirting. The decorative panels are thermoformed from a type of polymer known as ABS (Acytonitrile-Butadiene-Styrene). ABS is a highly durable material used in truck bodies, crash helmets, bumpers, sewer pipes and the like. ABS tolerates temperature extremes, remaining flexible at very low temperatures and it is capable of absorbing normal house movement and settling.

The first step of the present invention is to construct a form having a highly detailed, realistic surface. For example, actual stones or bricks are affixed to a wooden panel and are provided with mortar joints. Then the design is covered with a type of mold release to which is subsequently applied a thin layer of gel coat. A plurality of layers of fiberglass matte and resin are applied and then allowed to harden forming a durable mold in which its female side has been formed against the detailed surface of the form. The mold is then removed from the form and is provided with a plurality of holes or perforations.

The hardened fiberglass mold is placed inside a vacuum box having its female side facing upwardly and wherein vacuum suction is applied to the downwardly facing surface of the mold. A sheet of plastic is secured above the mold adjacent the female side and the sheet is then heated by an overhead radiant heater. When the plastic becomes sufficiently pliable, a vacuum is applied to the opposite side of the mold drawing the material inside the mold. The plastic is immediately cooled by applying a spray of water (or other cold fluid) and is then removed from the mold. Afterward, the resulting plastic panels are hand finished with a thin coat of automotive grade acrylic lacquer to complete their realistic appearance.

Various adaptations and modifications can be made on the basic decorative panel. Insulation may be provided by either a sprayed foam or affixing batts of insulation to the pan shaped reverse side of the panel. Additional frost heave protection is provided by placing a plurality of vertically disposed slots which have been incorporated in the mold, along the upper portion of the panels. These slots are approximately 4 to 6 inches in length and allow the panels to slide upwardly, thereby absorbing any frost heave.

BRIEF DESCRIPTION OF THE DRAWINGS

FIG. 4 is a side elevational view of the vacuum apparatus used in accordance with the present invention;

FIG. 5 is a diagrammatic representation showing a portion of the method in accordance with the present invention;

FIG. 6 is a plan view showing a completed decorative panel of assembly molded plastic as fabricated from the mold shown in FIG. 3;

FIG. 7 is a cross-sectional view taken along section ine 7—7 of FIG. 6;

DETAILED DESCRIPTION OF THE PREFERRED EMBODIMENTS

Figure 1:
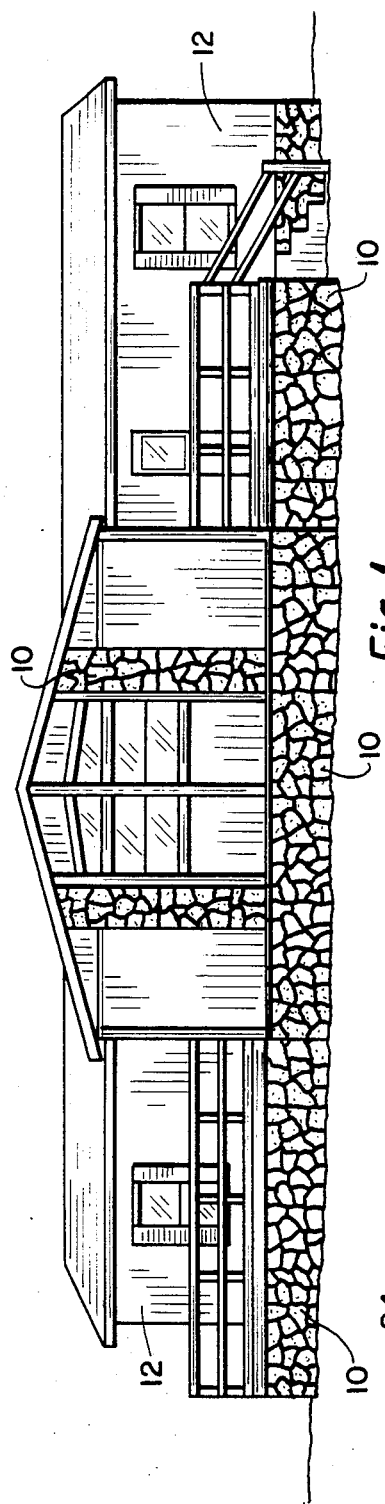
FIG. 1 is a side elevational view of a mobile home having a plurality of stone detailed panels of molded plastic attached thereto in accordance with the present invention.

Referring to the drawings in detail, FIG. 1 shows a plurality of stone decorative panels 10 of molded plastic installed as skirting on a mobile home 12. The panels 10 produced by the method of the present invention are primarily used as mobile home skirting although the panels may be used as roofing, exterior covering of metal or wooden structures or the like. The panels can also be used for interior decorative purposes. The stone patterned panels 10 shown in FIG. 1 are one example of the surface detail available through the present invention. Other patterns that can be obtained are simulated brick, shingles or adobe but the present invention is not limited thereto.

Figure 2:
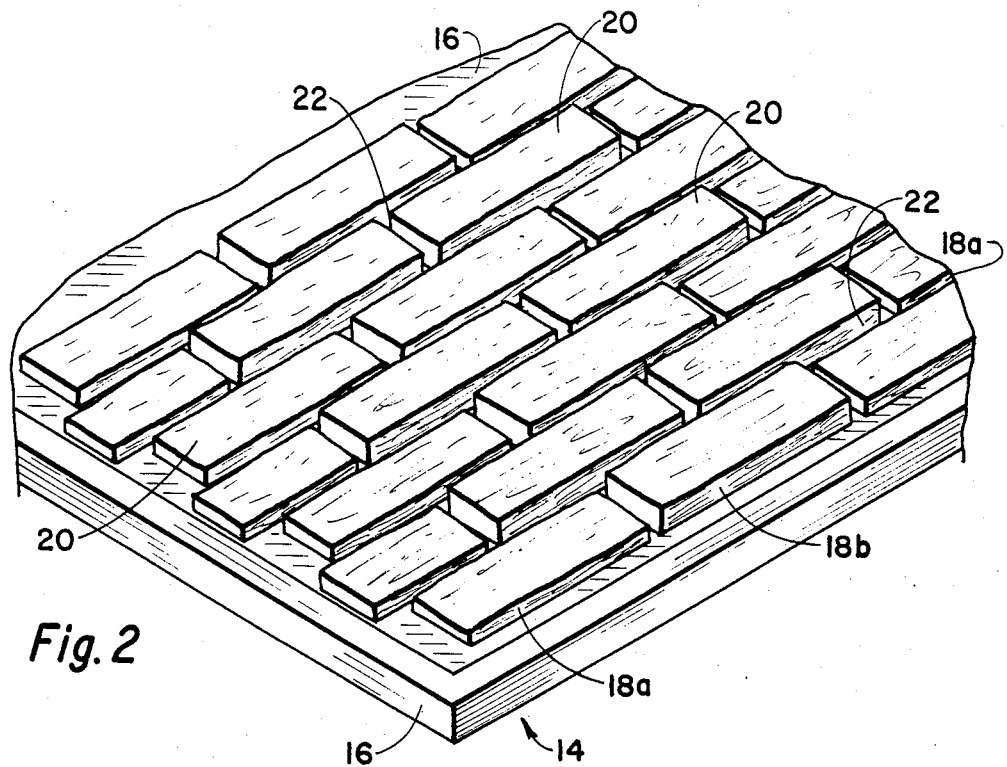
FIG. 2 is an isometric view of a portion of a pattern or form in accordance with the present invention.
Figure 3:
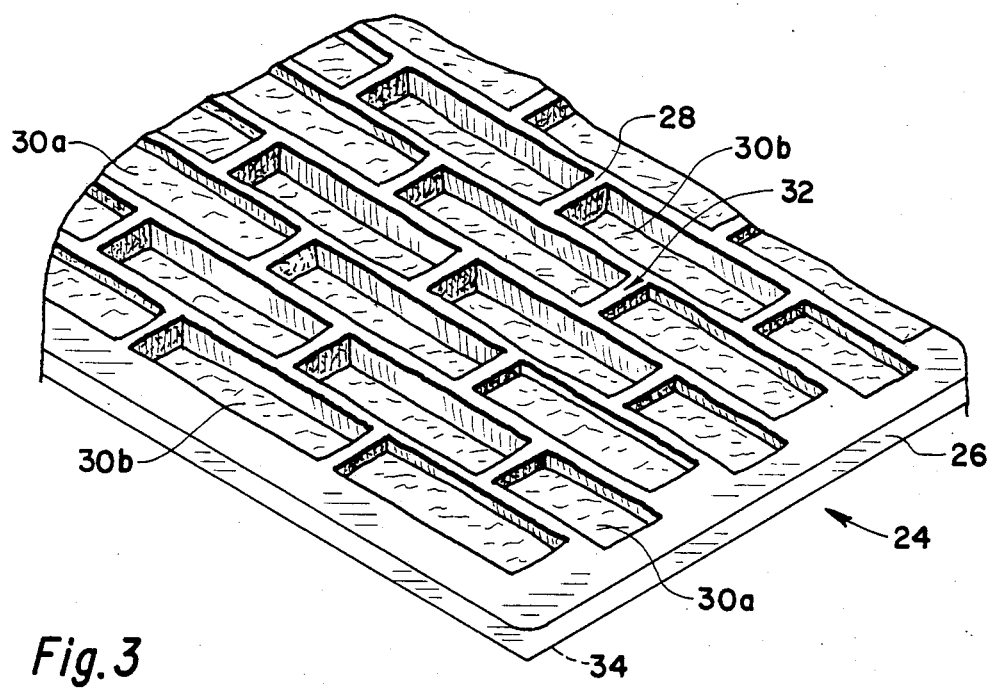
FIG. 3 is an isometric view of a portion of the mold produced by the form shown in FIG. 2.

Referring to FIGS. 2 and 3, a form 14 is constructed to provide a realistic duplication of an authentic masonry type wall. As an example, the form 14 will result in the production of a decorative panel of molded plastic having a brick detailed surface. Other forms can be constructed to obtain the aforementioned patterns. The form 14 comprises a wooden base 16, generally a plywood board having the dimensions of 4'×8', for example, and a plurality of rectangular wooden shims 18a and 18b affixed to base 16 in a brick-like pattern. Form 14 shown in FIG. 2 has been provided with shims 18b which are thicker than shims 18a. These shims (18b) have been arranged in alternating columns of "bricks" which are elevated higher above the plane of the panel than the thinner shims (18a), whose purpose will be disclosed hereinafter.

A thin layer of authentic brick veneer 20 is affixed to shim 18a and 18b. A mortar fill 22 comprising a sand and concrete mixture is placed between the "bricks" to form the mortar joints. Shaved stone or rock layers affixed to irregularly shaped shims would be used to construct the form to produce the panels 10 in FIG. 1. Any type of authentic material can be affixed to corresponding shims to generate a wide variety of patterns.

In order to produce the mold 24 shown in FIG. 3, a mold release such as PVA is applied to the entire detailed surface of the form 14. Then a thin layer of gel coat is applied to the layer of mold release and is allowed to harden. Gel coat is a high grade resin which is commonly used with fiberglass and which will harden to a very hard finish in a relatively thin layer. The gel coat can be either brush applied or sprayed and will provide an exact duplication of the details of the "bricks" 20. A plurality of layers (preferably about twelve or more) of fiberglass matte and resin is then brush applied to the gel coat layer and is allowed to harden. The resin is a standard fiberglass resin which is used to be absorbed into the matte.

The gel coat and resin referred to above will not be described in detail except to state that they are commonly used products in the marine industry (and similar industries) to produce fiberglass-reinforced plastic, such as in boat building. The basic difference in the gel coat, as compared to the resin, is that the former generally includes pigmentation and possibly different fillers. One suitable base material is neopentyl glycol. A suitable catalyst would be methyl-ethyl-ketone peroxide. Other suitable materials for the gel coat and resin are described and/or claimed in U.S. Pat. Nos. 4,081,496 (Finlayson), 4,473,675 (Knudson, Jr. et al.) and 4,497,918 (Wason).

The resulting plastic mold 24 is removed and is trimmed to securely fit into a portion of a specialized vacuum table (see FIGS. 4 and 5). The mold comprises the hardened fiberglass layers 26 having mortar detail 28 between a relatively shallow brick detail 30a (which corresponds to shim height 18a) and a deep brick detail 30b (which corresponds to shim 18b). As shown, mold 24 has its detailed surface formed against its female side 32 and a side opposite 34. The above described method of mold formation provides a highly durable heat resistant mold 24 which can last several years.

Referring to FIGS. 4 and 5, the mold 24 is vented by perforating its lower surface 34 with a plurality of about 100 to 200 holes 36 and is placed inside a vacuum box 40 of the specialized vacuum table 42. The holes 36 provide fluid communication between the female side 32 of the mold and the side opposite 34. The side opposite is adjacent to a vacuum means provided by vacuum lines 44 attached to the underneath surface of box 40. The lines 44 are fed into a tank 46 which is powered by a pump 48.

A sheet 50 of high impact plastic material is used to cast the decorative molded panel. The sheets are approximately 1/16" thick, consisting of a material such as ABS. ABS is a terepolymer comprising two types of synthetic elastomeric rubber and two types of thermoplastic polymers. Sheet 50 is set on inside a retention frame (not shown) on support flange so as to be disposed above mold box 40. The sheet is locked into position by means of a clamp or rack 52 which is pivotally connected at 54 to a portion of the upper support framework 56 of table 42. The rack 52 is swung upwardly or downwardly by means of a handle 58.

After sheet 50 has been secured in position above and adjacent the female side 32 of the mold, an overhead radiant or infra-red heater 60 is activated to heat the plastic sheet to a pliable state. As the plastic is heated, an operator engages a ram lever 62 which allows air pressure into a cylinder 64 by means of lines 66. A piston 68 and a ram 70 pushes the mold box 40 upwardly into a sealed position directly adjacent the retention frame holding the now pliant plastic sheet 50. The operator now engages a vacuum lever 72 thereby applying a vacuum to the side opposite 34 of the mold 24. The vacuum process removes the air between sheet 50 and the mold 24 thereby drawing the plastic into the female side and creating a duplicate thereon.

The box 40 is lowered away and the newly formed panel is cooled with a spray of water. Rack 52 is pivoted away from the plane of the table 42 so that the panel can be removed. As described, the method of the present invention incorporates an assembly-line process which allows for the relatively rapid production of 20–40 panels per hour.

Referring to FIGS. 6 and 7, the brick decorative panel 80 now receives a thin coat of acrylic lacquer, for example, which is sponge applied to highlight the surface details thus providing a more realistic appearance.

Panel 80 comprises a detailed surface 82 and perimeter lips or flanges 84. As shown, the panel is provided with offset columns of bricks 86a and 86b which correspond to 30a and 30b of the mold 24. The offset columns eliminates any warped appearance that might occur to the installed panels due to the normal settling and shifting of a mobile home.

Figure 8:
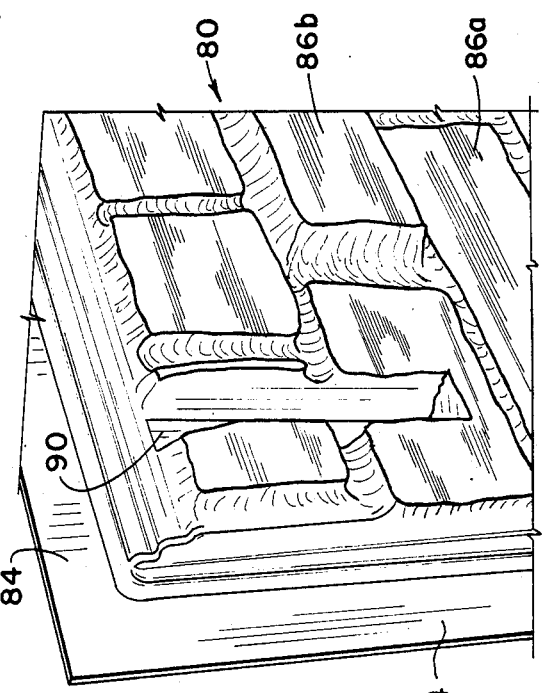
FIG. 8 is an enlarged isometric view of the upper right hand corner of the panel in FIG. 6, showing the finished details thereof.
Figures 9A, 9B:
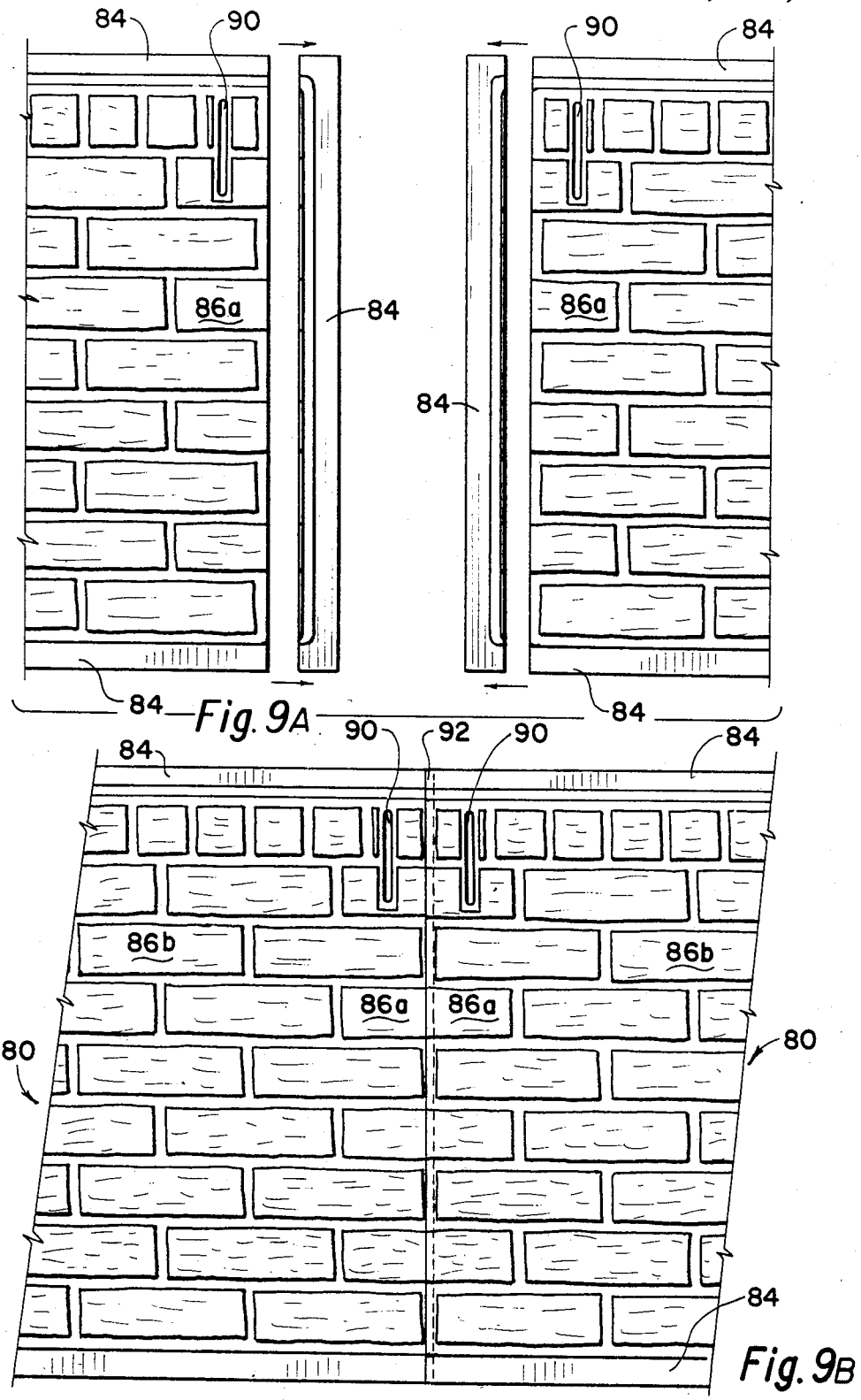
FIG. 9 is a top plan of two panels showing a continuous jointing pattern in accordance with the present invention.

As shown in FIGS. 6, 8 and 9, the decorative panels can be provided with a plurality of vertically disposed slots 90 approximately 4 to 6 inches in length. These slots provide frost heave protection needed in northern climates by allowing the installed panels to slide upwardly thereby preventing damage to the panels.

Another variation shown in FIG. 9 in which adjacent side flanges 84 are carefully cut away. A concealed seam line 92 is created by jointing the two panels so that one panel slightly overlaps the other. Additionally, any panel can be provided with an insulation backing (not shown) on the side opposite the detailed surface of the molded plastic panel. The insulation may either be a sprayed foam: or affixed batts placed in the pan-shaped side of the panel opposite its detailed surface.

What is claimed is:

1. An improved method of forming a decorative panel of molded plastic comprising the steps of,
   constructing a form having a realistically detailed surface;
   covering said detailed surface with a mold release material;
   applying a thin layer of gel coat over said mold release material;
   applying a plurality of layers of fiberglass matte and resin over said gel coat layer;
   allowing said plurality of layers of fiberglass matte and resin to harden thereby forming a mold having a female side being formed against said detailed surface and a side opposite from said female side;
   removing said mold from said form;
   perforating said mold with a plurality of small holes thereby providing fluid communication between said female side and said side opposite;
   providing a vacuum means to said side opposite of said mold;
   placing a sheet of plastic in a retention means, thereby disposing said sheet above and adjacent said female side of said mold;
   locking said sheet of plastic in said retention means;
   activating a heating means, thereby heating said sheet to a pliable state;
   activating a ram means, thereby placing said mold in a sealed position directly adjacent the pliable sheet of plastic;
   activating said vacuum means, thereby drawing said pliable sheet of plastic into said female side of said mold;
   cooling said formed panel; and
   unlocking said retention means and removing said formed panel from said mold;
   wherein the step of constructing a form having a realistically detailed surface includes the steps of,
   constructing a rectangular wooden base;
   affixing shims of varying thicknesses to the wooden base; and
   affixing a veneer of authentic material to each shim thereby resulting in a detailed surface duplicating an actual structure comprised of the authentic material.

2. An improved method as set forth in claim 1 wherein said veneer of authentic material comprises a layer of bricks.

3. An improved method as set forth in claim 1 wherein said veneer of authentic material comprises a layer of stone.

4. An improved method as set forth in claim 1 wherein said veneer of authentic material comprises a layer of shingles.

5. An improved method as set forth in claim 1 and including finishing said formed panel with a layer of acrylic lacquer on its detailed surface.

6. An improved method as set forth in claim 1 and including the application of insulation material to the side opposite of the detailed surface of said formed panel.

* * * * *